(12) United States Patent
Futaki

(10) Patent No.: US 11,228,881 B2
(45) Date of Patent: *Jan. 18, 2022

(54) METHOD AND APPARATUS FOR PROVISIONING V2X SERVICES

(71) Applicant: NEC CORPORATION, Tokyo (JP)

(72) Inventor: Hisashi Futaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/744,370

(22) Filed: Jan. 16, 2020

(65) Prior Publication Data

US 2020/0204967 A1 Jun. 25, 2020

Related U.S. Application Data

(63) Continuation of application No. 15/760,728, filed as application No. PCT/JP2016/002979 on Jun. 21, 2016, now Pat. No. 10,623,920.

(30) Foreign Application Priority Data

Sep. 18, 2015 (JP) .................... 2015-185290

(51) Int. Cl.
*H04W 4/40* (2018.01)
*H04W 8/24* (2009.01)
(Continued)

(52) U.S. Cl.
CPC ............. *H04W 4/40* (2018.02); *H04W 8/24* (2013.01); *H04W 36/08* (2013.01); *H04W 36/30* (2013.01);
(Continued)

(58) Field of Classification Search
CPC ....... H04W 4/40; H04W 88/04; H04W 92/18; H04W 76/10; H04W 36/08; H04W 36/30;
(Continued)

(56) References Cited

U.S. PATENT DOCUMENTS

2010/0087980 A1  4/2010 Spura
2011/0319106 A1  12/2011 Lim et al.
(Continued)

FOREIGN PATENT DOCUMENTS

CN      1917706 A    2/2007
CN    102761404 A   10/2012
(Continued)

OTHER PUBLICATIONS

Further operational aspecs on PC5-based and Uu-based V2x; 3GPP TSG RAN WG1 Meeting #82bis R1-155877 Malmö, Sweden, Oct. 5-9, 2015.
(Continued)

*Primary Examiner* — Tejis Daya
(74) *Attorney, Agent, or Firm* — Sughrue Mion, PLLC

(57) ABSTRACT

A base station apparatus (130, 220) in a network (410) transmits V2X support information indicating that a V2X service is supported by the network (410). In response to receiving V2X support information, a radio terminal (100, 120) transmits, to the network (410), V2X terminal information indicating that the radio terminal (100, 120) is interested in the V2X service. The network (410) transmits V2X configuration to the radio terminal (100, 120) in response to receiving the V2X terminal information transmitted from the radio terminal (100, 120). The radio terminal (100, 120) receives the V2X configuration and performs V2X communication in accordance with the V2X configuration. It is thus, for example, possible to contribute to achievement of a procedure for performing provisioning for the V2X service on the radio terminal that intends to use the V2X service.

24 Claims, 12 Drawing Sheets

(51) Int. Cl.
  *H04W 88/04* (2009.01)
  *H04W 92/18* (2009.01)
  *H04W 76/10* (2018.01)
  *H04W 36/08* (2009.01)
  *H04W 36/30* (2009.01)
  *H04W 36/38* (2009.01)
  *H04W 48/10* (2009.01)
  *H04W 48/20* (2009.01)
  *H04W 72/04* (2009.01)

(52) U.S. Cl.
  CPC ........... *H04W 36/38* (2013.01); *H04W 48/10* (2013.01); *H04W 48/20* (2013.01); *H04W 72/042* (2013.01); *H04W 76/10* (2018.02); *H04W 88/04* (2013.01); *H04W 92/18* (2013.01)

(58) Field of Classification Search
  CPC ..... H04W 36/38; H04W 48/10; H04W 48/20; H04W 72/042; H04W 8/24; H04W 4/50; H04W 88/08
  See application file for complete search history.

(56) References Cited

U.S. PATENT DOCUMENTS

| | | |
|---|---|---|
| 2014/0051346 A1 | 2/2014 | Li et al. |
| 2015/0065142 A1 | 3/2015 | Song |
| 2015/0195827 A1 | 7/2015 | Feng et al. |
| 2015/0282210 A1 | 10/2015 | Li et al. |
| 2016/0073298 A1 | 3/2016 | Brahmi et al. |
| 2016/0242223 A1 | 8/2016 | Brahmi et al. |
| 2016/0295624 A1 | 10/2016 | Novlan et al. |
| 2016/0330728 A1 | 11/2016 | Sorrentino et al. |
| 2018/0035276 A1 | 2/2018 | Kang et al. |
| 2018/0146484 A1 | 5/2018 | Kahtava et al. |
| 2018/0213365 A1* | 7/2018 | Yi .......................... H04W 4/40 |
| 2018/0213376 A1* | 7/2018 | Pinheiro .............. G08G 1/0112 |
| 2018/0227971 A1 | 8/2018 | Yasukawa et al. |
| 2018/0242385 A1 | 8/2018 | Chandramouli et al. |

FOREIGN PATENT DOCUMENTS

| | | |
|---|---|---|
| CN | 103096247 A | 5/2013 |
| CN | 104202073 A | 12/2014 |
| EP | 3 113 566 A1 | 1/2017 |
| JP | 2013-527697 A | 6/2013 |
| WO | 2014/173429 A1 | 10/2014 |
| WO | 2015/130060 A1 | 9/2015 |

OTHER PUBLICATIONS

3rd Generation Partnership Project; Technical Specification Group Services and System Aspects Study on LTE Support for V2X Services (Release 14); 3GPP TR 22.885 V0.2.0 (Apr. 2015).

Considerations of V2X implications to RAN operation; 3GPP TSG-RAN WG2 Meeting #91 bis R2-154147 Malmo, Sweden, Oct. 5-9, 2015.

Overview of V2X features and specification impact; 3GPP TSG RAN WG1 Meeting #82 R1-154190 Beijing, China, Aug. 24-28, 2015.

"Draft Standard for Wireless Access in Vehicular Environments (WAVE)—Networking Services", IEEE P1609.3™/D9, Aug. 2010, 133 pages total.

V2X deployment scenarios and modelling; 3GPP TSG RAN WG1 Meeting #82 R1-154492 Beijing, China, Aug. 24-28, 2015.

Extended European Search Report dated Mar. 14, 2019 issued by the European Patent Office in counterpart application No. 16845858.6.

International Search Report of PCT/JP2016/002979 filed Sep. 13, 2016.

Communication dated Jan. 21, 2020 from the China National Intellectual Property Administration in Application No. 201680054240.7.

Communication dated Feb. 14, 2020 from European Patent Office in Application No. 16845858.6.

Japanese Office Action for JP Application No. 2020-077087 dated Jun. 8, 2021 with English Translation.

* cited by examiner

METHOD AND APPARATUS FOR PROVISIONING V2X SERVICES

CROSS REFERENCE TO RELATED APPLICATIONS

This is a Continuation of U.S. patent application Ser. No. 15/760,728, filed Mar. 16, 2018, which is a National Stage of International Application No. PCT/JP2016/002979 filed Jun. 21, 2016, claiming priority based on Japanese Patent Application No. 2015-185290 filed Sep. 18, 2015, the contents of all of which are incorporated herein by reference in their entirety.

TECHNICAL FIELD

The present disclosure relates to a radio communication system and, in particular, to a V2X service.

BACKGROUND ART

Non-Patent Literature 1 discloses use cases and potential requirements regarding Long Term Evolution (LTE) based Vehicle-to-Everything (V2X) services. The V2X means vehicular communications and includes Vehicle-to-Vehicle (V2V) communications, Vehicle-to-Infrastructure (V2I) communications, and Vehicle-to-Pedestrian (V2P) communications. The V2V communications or the V2V Services are communication or services between User Equipments (UEs) that are installed in vehicles and use V2V applications. The V2I communications or the V2I Services are communications or services between a UE and a Road Side Unit (RSU), both of which use V2I applications. The V2I communication includes Infrastructures-to-Vehicle (I2V) communications, unless otherwise specified. Further, the term "UE" as used herein includes not only a UE installed in a vehicle but also a UE carried by a pedestrian. The RSU is an entity located on a road side and supports V2I Services including transmission and reception to and from vehicle UEs that use V2I applications. The RSU is installed in a base station, such as a LTE base station (i.e., Evolved Node B (eNB)), or in a stationary UE. The V2P communications or the V2P Services are communications or services between a vehicle UE and a pedestrian UE, both of which use the V2I application. The V2P communications may be performed via an RSU and is, accordingly, referred to as V2I2P communications or P2I2V communications.

Some use cases regarding the V2I Service disclosed in Non-Patent Literature 1 will be introduced here. Non-Patent Literature 1 discloses, in Section 5.6 V2I Emergency Stop Use Case, a configuration in which a vehicle and an RSU are each equipped with a Prose-enabled UEs and the vehicle and the RSU perform Proximity-based services (Prose) communication. ProSe communication is device-to-device (D2D) communication and includes direct communication between two or more ProSe-enabled UEs that are in proximity to each other. In this use case, a vehicle A transmits a message indicating an event, such as an emergency stop, to a service RSU. The service RSU receives this message from the vehicle A and then relays this message to its surrounding vehicles. All vehicles within the transmission range from the service RSU are able to receive this message.

In the use case disclosed in Section 5.14 "V2X Road safety service via infrastructure" of Non-Patent Literature 1, an RSU C detects that an accident has occurred in the area where the RSU C manages. The RSU C indicates the occurrence of this accident to a remote server (e.g., a Traffic Safety Server (TSS) or an Intelligent Transport Systems (ITS) server) and starts transmission of this information in the area. The server informs other RSUs near the RSU C that there is an accident in the area managed by the RSU C. The other RSUs start transmission of V2X messages indicating that there is an accident in the area indicated by the RSU C.

CITATION LIST

Non-Patent Literature

[Non-Patent Literature 1] 3GPP S1-151330 "3GPP TR 22.885 V0.2.0 Study on LTE Support for V2X services (Release 14)", April 2015

SUMMARY OF INVENTION

Technical Problem

Non-Patent Literature 1 does not disclose any specific procedure for starting the V2X service. Accordingly, a procedure for performing provisioning for the V2X service on a UE using the V2X service, such as a vehicle UE, a pedestrian UE, or an RSU having a UE function, is not clear.

One of the objects to be attained by embodiments disclosed herein is to provide an apparatus, a method, and a program that contribute to achievement of a procedure for performing provisioning for a V2X service on a radio terminal that intends to use the V2X service. It should be noted that this object is merely one of the objects to be attained by the embodiments disclosed herein. Other objects or problems and novel features will be made apparent from the descriptions in the specification and the accompanying drawings.

Solution to Problem

In a first aspect, a base station apparatus includes at least one wireless transceiver and at least one processor. The at least one processor is configured to: transmit, via the at least one wireless transceiver, V2X support information indicating that a Vehicle-to-Everything (V2X) Service is supported by a serving network including the base station apparatus; and in response to receiving V2X terminal information transmitted from a first radio terminal that has received the V2X support information, transmit V2X configuration to the first radio terminal.

In a second aspect, a method in a base station apparatus includes: (a) transmitting V2X support information indicating that a Vehicle-to-Everything (V2X) Service is supported by a serving network including the base station apparatus; and (b) in response to receiving V2X terminal information transmitted from a first radio terminal that has received the V2X support information, transmitting V2X configuration to the first radio terminal.

In a third aspect, a radio terminal includes at least one wireless transceiver and at least one processor. The at least one processor is configured to: receive from a serving network, via the at least one wireless transceiver, V2X support information indicating that a Vehicle-to-Everything (V2X) Service is supported by the serving network; transmit to the serving network, in response to receiving the V2X support information, V2X terminal information indicating that the radio terminal is interested in the V2X service; receive V2X configuration that is transmitted from the serving network in response to the transmission of the V2X terminal information; and perform V2X communication in accordance with the V2X configuration.

In a fourth aspect, a method in a radio terminal includes: (a) receiving, from a serving network, V2X support information indicating that a Vehicle-to-Everything (V2X) Service is supported by the serving network; (b) transmitting to the serving network, in response to receiving the V2X support information, V2X terminal information indicating that the radio terminal is interested in the V2X service; and (c) receiving V2X configuration that is transmitted from the serving network in response to the transmission of the V2X terminal information, and performing V2X communication in accordance with the V2X configuration.

In a fifth aspect, a cellular communication network includes one or more base stations and a control entity. The one or more base stations are configured to transmit V2X support information indicating that a Vehicle-to-Everything (V2X) Service is supported by the cellular communication network. The control entity is configured to, in response to receiving V2X terminal information transmitted from a first radio terminal that has received the V2X support information, transmit V2X configuration to the first radio terminal via the one or more base stations.

In a sixth aspect, a method in a cellular communication network includes: (a) transmitting V2X support information indicating that a Vehicle-to-Everything (V2X) Service is supported by the cellular communication network from one or more base stations, and (b) in response to receiving, via the one or more base stations, V2X terminal information transmitted from a first radio terminal that has received the V2X support information, transmitting V2X configuration from a control entity to the first radio terminal via the one or more base stations.

In a seventh aspect, a program includes instructions (software codes) that, when loaded into a computer, cause the computer to perform the method according to the above-described second or fourth aspect.

Advantageous Effects of Invention

According to the above-described aspects, it is possible to provide an apparatus, a method, and a program that contribute to achievement of a procedure for performing provisioning for the V2X service on a radio terminal that intends to use the V2X service.

DESCRIPTION OF EMBODIMENTS

Specific embodiments are described hereinafter in detail with reference to the drawings. The same or corresponding elements are denoted by the same reference signs throughout the drawings, and repetitive descriptions will be omitted as necessary for clarity of explanation.

The following descriptions on the embodiments mainly focus on an Evolved Packet System (EPS) that contains LTE and System Architecture Evolution (SAE). However, these embodiments are not limited to being applied to the EPS and may be applied to other mobile communication networks or systems such as 3GPP UMTS, 3GPP2 CDMA2000 systems (1×RTT, High Rate Packet Data (HRPD)), global system for mobile communications (GSM (trademark))/General packet radio service (GPRS) systems, and WiMAX systems.

First Embodiment

Figure 1:
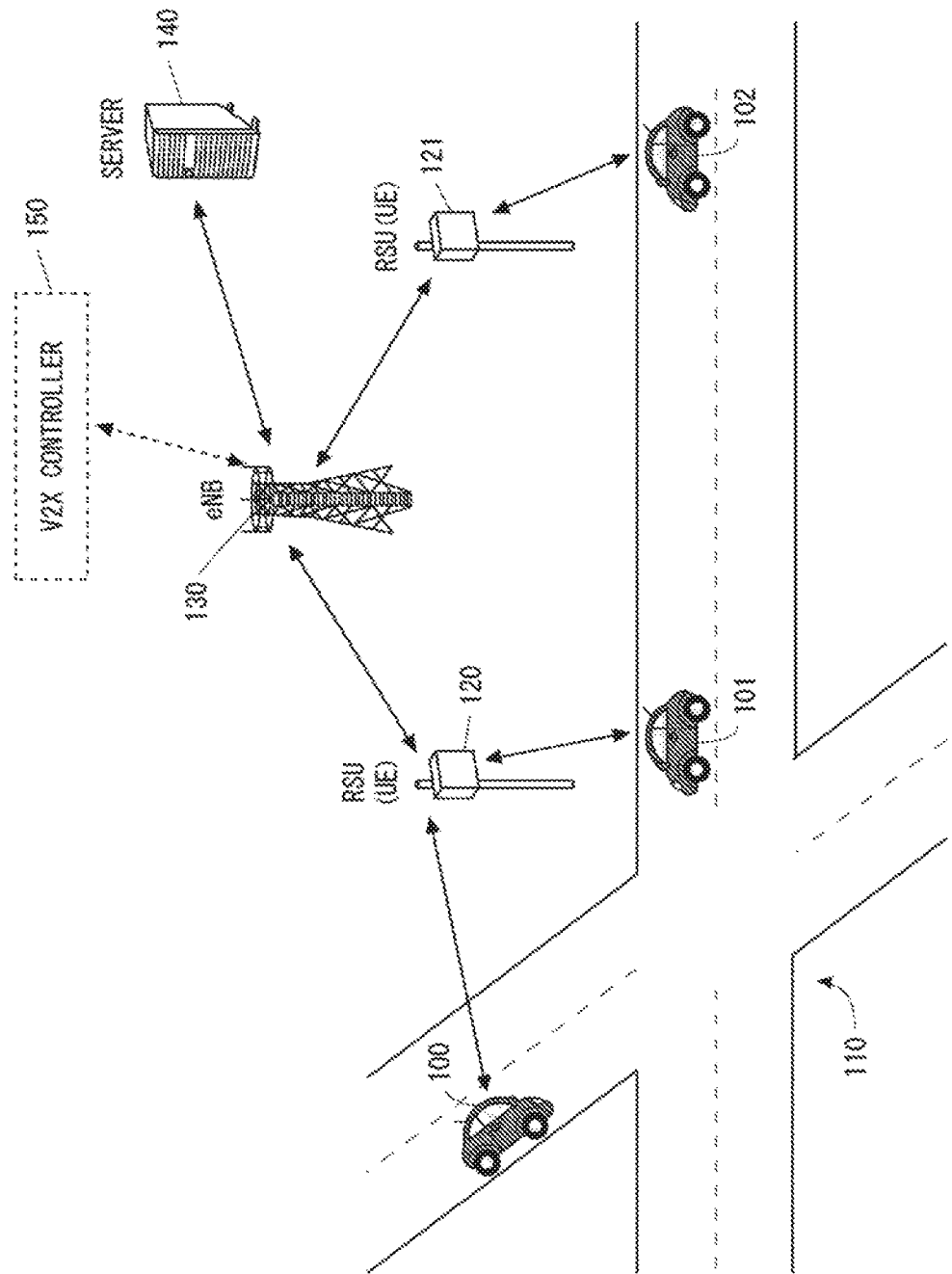
FIG. 1 is a diagram showing a configuration example of a radio communication system according to an embodiment.

FIG. 1 shows a configuration example of a radio communication system according to some embodiments including a first embodiment. Radio terminals (i.e., UEs) 100-102 are installed in vehicles. Each of the vehicle UEs 100-102 may be implemented in an in-vehicle processing unit (e.g., a car navigation system). The vehicle UEs 100-102 each execute a V2I application to support the V2I Service. The UEs 100-102 may support another V2X service, i.e., a V2V Service or a V2P Service or both.

RSUs 120 and 121 are each installed on a road side. In the example shown in FIG. 1, the RSU 120 is installed near an intersection 110. The RSUs 120 and 121 each may be equipped with, for example, but not limited to, a Prose-enabled UE, and may perform ProSe communication with the vehicle UEs 100-102 to provide the V2I Service. The RSUs 120 and 121 may each serve as a ProSe UE-to-Network Relay (i.e., Relay UE). The ProSe UE-to-Network Relay mainly relays traffic (i.e., downlink and uplink) between a UE in out-of-coverage (i.e., remote UE) and the network. The RSUs 120 and 121 each communicate with a base station (eNB) 130 in a cellular communication network via a radio connection and also communicate with a server 140 (e.g., an ITS server or a TSS) via the eNB 130.

As already described above, Proximity-based services (ProSe) defined in 3GPP Release 12 are one example of D2D communication. The D2D communication includes at least one of Direct Communication and Direct Discovery. In 3GPP Release 12, an inter-UE radio link used for Direct Communication or Direct Discovery is referred to as a PC5 interface or Sidelink. Accordingly, it can be said that ProSe is a general term for communications (or services) that use at least the Sidelink. In the example shown in FIG. 1, the communication between the RSU 120 serving as a UE or a Relay UE and the UE 100 or 101 may use the Sidelink, and the communication between two or more UEs may also use the Sidelink. In 3GPP Release 12, sidelink transmission uses the same frame structure as uplink and downlink transmission of the Long Term Evolution (LTE), and uses a subset of uplink resources in frequency and time domains. In 3GPP Release 12, a UE performs sidelink transmission by using Single-Carrier Frequency-Division Multiple Access (SC-FDMA), which is similar to the scheme used in uplink transmission.

The server 140 communicates with the UEs 100-102 and the RSUs 120 and 121 that support the V2X service. More specifically, the server 140 communicates with a V2X application executed in each of the UEs 100-102 and the RSUs 120 and 12, on the application layer (application level) through a cellular communication network including the base station 130. In other words, the reference point between the server 140 and each of the UEs 100-102 may depend on the user plane of the cellular communication network and signalling and data between the server 140 and the UEs 100-102 may be transmitted on the user plane. In a similar way, the reference point between the server 140 and each of the RSUs 120 and 121 may depend on the user plane of the cellular communication network.

The server 140 may be an ITS server or a TSS. For example, in response to receiving, from the RSU 120, report information indicating that an accident has occurred, the server 140 may inform other RSUs (e.g., RSU 121) near the RSU 120 that there is an accident in the area managed by the RSU 120.

Further, in some implementations, to utilize the V2X service provided by the cellular communication network, the UEs 100-102 may communicate with a V2X controller 150 via the base station 130 (and via the core network). Similarly, the RSUs 120 and 121 each serving as a UE may communicate with the V2X controller 150 via the base station 130 (and via the core network).

The V2X controller 150 provides logical functions used to perform operations in association with the cellular communication network (i.e., Public Land Mobile Network (PLMN)) to provide the V2X service. For example, the V2X controller 150 may perform authentication or approval of the UEs 100-102 for the V2X service. The V2X controller 150 may perform authentication or approval of the RSUs 120 and 121 serving as UEs. The V2X controller 150 may be referred to as a V2X function entity.

The reference point or interface between the server 140 and each of the UEs 100-102 (and the RSUs 120 and 121) may depend on the user plane of the cellular communication network and signalling and data between the server 140 and the UEs 100-102 (and the RSUs 120 and 121) may be transmitted on the user plane.

Figure 2:
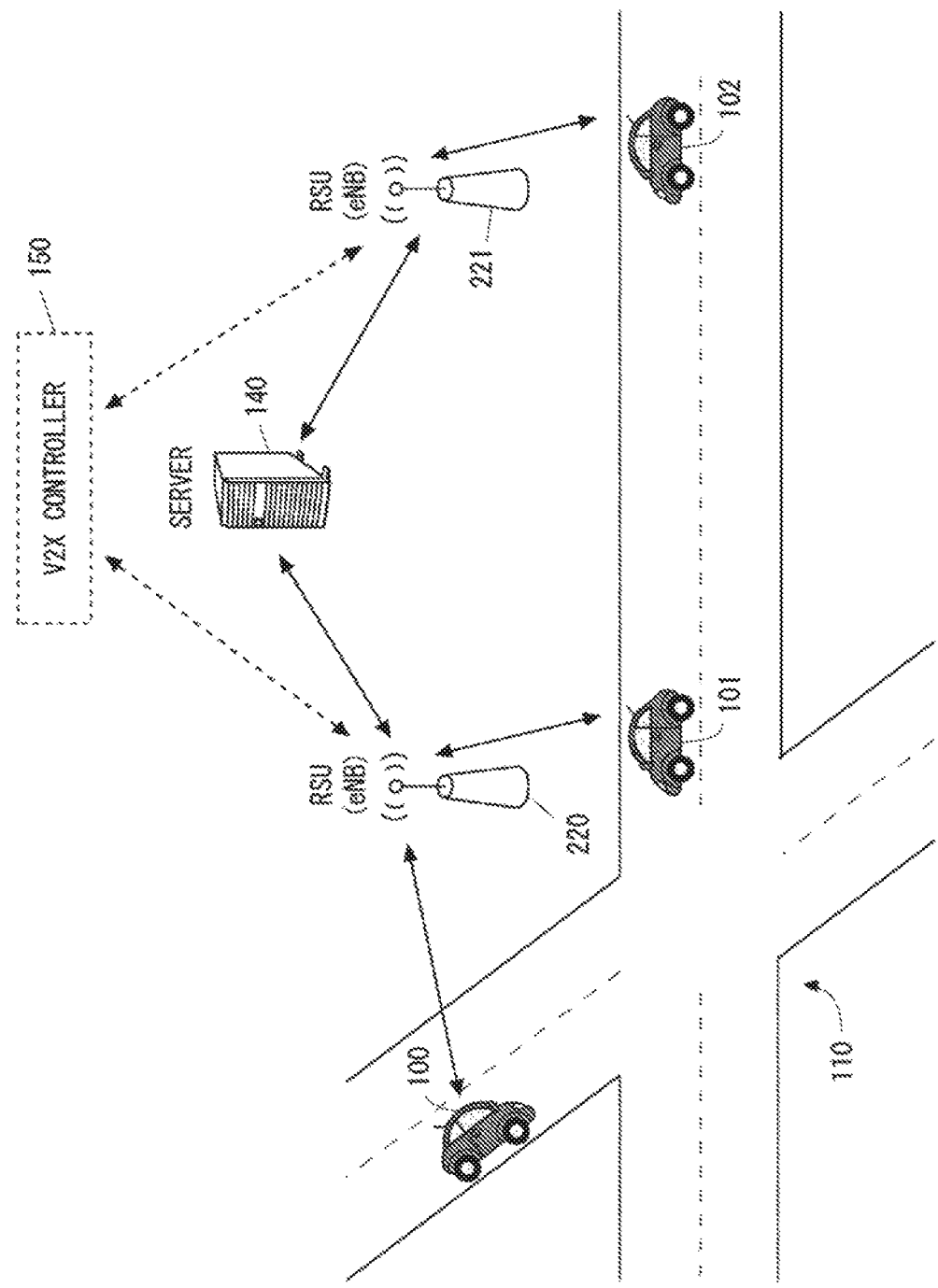
FIG. 2 is a diagram showing a configuration example of a radio communication system according to an embodiment.

FIG. 2 shows another configuration example of the radio communication system according to some embodiments including the first embodiment. In the example shown in FIG. 2, each of RSUs 220 and 221 serves as a base station (eNB).

In the configurations shown in FIGS. 1 and 2, some or all of the UEs 100-102 may be pedestrian UEs. Further, in the configurations shown in FIGS. 1 and 2, the server 140 may be co-located in the same site together with the eNB 130 or with the RSU 220 or 221 serving as an eNB. Such a server is referred to as a Mobile Edge Computing (MEC) server. Alternatively, the server 140 may be installed at a remote site that is geographically located apart from the site where the eNB 130 (or the RSU 220 or 221) is installed and communicate with the eNB 130 via one or more entities (e.g., a Mobility Management Entity, a Packet Data Network Gateway (P-GW), and a Serving Gateway (S-GW)) in the cellular communication network.

Figure 3:
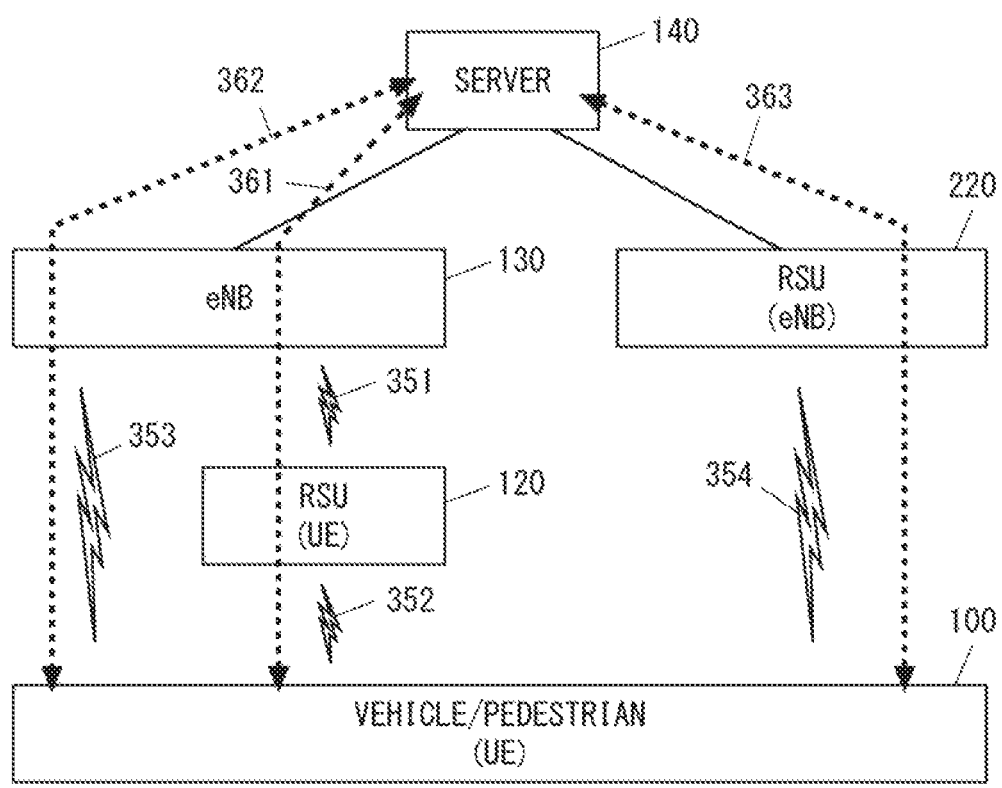
FIG. 3 is a diagram showing an example of architecture/deployments of a radio communication system according to an embodiment.

FIG. 3 is a diagram showing an example of architecture/deployments of the radio communication system according to some embodiments including the first embodiment. As described above with reference to FIGS. 1 and 2, the RSUs 120 and 121 each have the functions of a UE in one implementation, and the RSU 220 has the functions of an eNB in another implementation. That is, in some implementations, a UE (e.g., the UE 100) supporting the V2X service is able to communicate with the server 140 via a path 361 that passes through the RSU 120 serving as a UE and the eNB 130. Additionally or alternatively, in some implementations, as shown in a path 362 of FIG. 3, a UE (e.g., the UE 100) can be directly connected to the eNB 130 without traversing the RSU 120 and communicate with the server 140. Additionally or alternatively, in some implementations, as shown in a path 363 of FIG. 3, a UE (e.g., the UE 100) can be connected to the RSU 220 serving as an eNB and communicate with the server 140 via the RSU 220.

Communication 351 between the RSU 120 serving as a UE and the eNB 130 may use a dedicated carrier frequency band f1 reserved for the V2X service. Alternatively, the communication 351 may use a shared frequency band (or a Shared spectrum) f2 that is not licensed to any operator or is shared by a plurality of operators. Such a communication using a shared frequency is referred to as Licensed Shared Access (LSA). Alternatively, the communication 351 may use a carrier frequency band f3 that is licensed to an operator of the cellular communication network. Similar to the communication 351, communication 352 between the UE 100 and the RSU (UE) 120, communication 353 between the UE 100 and the eNB 130, and communication 354 between the UE 100 and the RSU 220 serving as an eNB may use any one of the above-described frequency bands f1, f2, and f3. Further, communication between UEs (not shown) may also use any one of the above-described frequency bands f1, f2, and f3.

Figure 4:
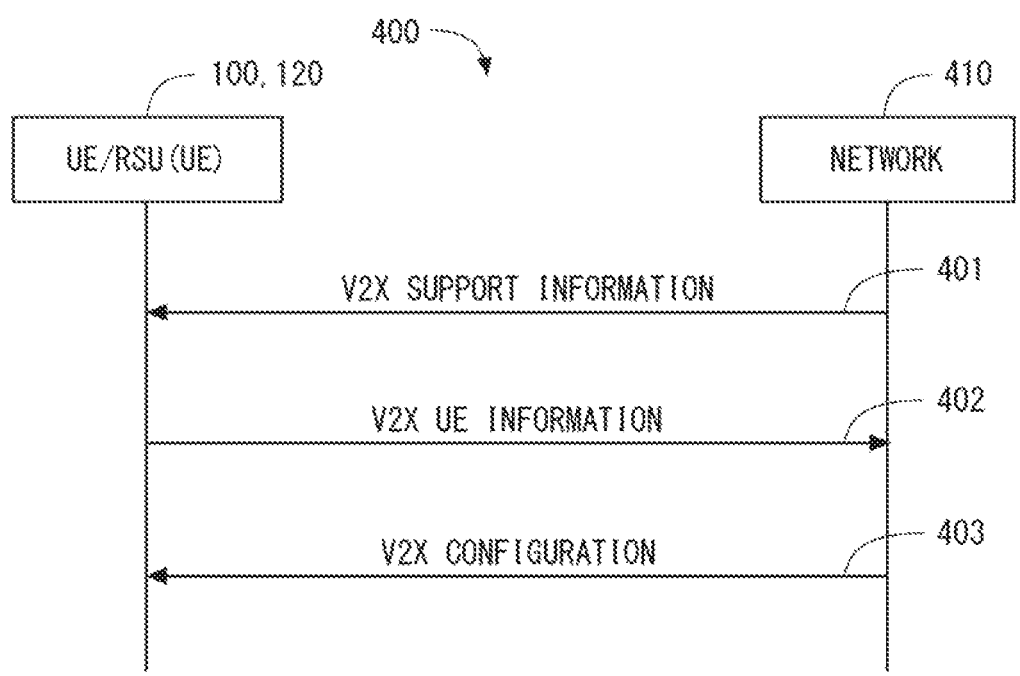
FIG. 4 is a sequence diagram showing one example of a provisioning procedure for a V2X service according to an embodiment.

Next, in the following description, a procedure for provisioning the V2X service will be explained. FIG. 4 is a sequence diagram showing a process 400, which is one example of the provisioning procedure. A network 410 includes at least the eNB 130 in the configuration example in FIG. 1 or includes at least the RSU 220 serving as an eNB in the configuration example shown in FIG. 2. The network 410 may further include the V2X controller 150.

In Step 401, the network 410 transmits V2X support information indicating that the V2X service is supported by a serving network (cellular communication network) including the eNB 130. The V2X support information is transmitted by the eNB 130 or by the RSU 220 serving as an eNB. Further, the V2X support information may be transmitted by an RSU serving as a UE. In this case, this RSU may broadcast or groupcast a part or all of the V2X support information received from the eNB 130.

The V2X support information may indicate at least one of: (a) the V2X service is available; (b) a carrier frequency band to be used for the V2X service; (c) measurement configuration of the carrier frequency band to be used for the V2X service; (d) a supported type(s) of the V2X service (e.g., V2V, V2I, V2P); and (e) transmission power allowed for the radio terminal for the V2X service. The transmission of the V2X support information may implicitly indicate that (a) the V2X service is available. Further, together with the indication of (b) a carrier frequency band to be used for the V2X service, an identifier (e.g., a PLMN identity list) of a network or an identifier (e.g., a V2X area list) of an area in which the V2X service is provided may be transmitted.

Additionally or alternatively, the V2X support information may indicate a radio resource pool to be used by each UE for autonomous resource selection for the V2X service. This radio resource pool may include: a radio resource pool per type of V2X service included in the V2X service (e.g., V2V, V2I, V2P); a radio resource pool per V2X operation mode (e.g., a relay mode, a direct mode) of an RSU serving as a UE; a radio resource pool per V2X service area; a radio resource pool per device type of a UE (e.g., RSU, Vehicle, Pedestrian); or a radio resource pool per pre-configured category (e.g., speed, traveling (or moving) direction, traffic lane). This radio resource pool may be configured for each carrier frequency band on which the V2X service is performed.

Additionally or alternatively, the V2X support information may include a synchronization configuration for V2X.

The eNB 130 or the RSU (eNB) 220 may broadcast the V2X support information in a cell served by the eNB 130 or the RSU (eNB) 220 in such a way that at least UEs in an idle state (e.g., RRC IDLE) are able to receive the V2X support information. The eNB 130 or the RSU (eNB) 220 may transmit the V2X support information on a Broadcast Control Channel (BCCH) that carries a System Information Block (SIB).

The eNB 130 or the RSU (eNB) 220 may transmit the V2X support information on both a first carrier frequency band used for the cellular communication (e.g., the frequency band f3 licensed to the cellular operator) and a second carrier frequency band used for the V2X service (e.g., the frequency band f1 dedicated for V2X). In some implementations in which the V2X support information is transmitted on both these two frequency bands, information transmitted on one of the frequency bands (e.g., the frequency band f3 licensed to the cellular operator) may be prioritized over information transmitted on the other one of the frequency bands (e.g., the frequency band f1 dedicated for V2X).

In some implementations, when the UE 100 is out-of-coverage of the cellular communication network, the UE 100 may use the V2X support information transmitted on the V2X dedicated frequency band f1. For example, the RSU (UE) 120 may receive the V2X support information transmitted from the eNB 130 and then broadcast or groupcast (at least a part of) the received V2X support information on the frequency band f1 dedicated for the V2X service. Alternatively, the RSU (UE) 120 may transfer (or relay) the received V2X support information to the UE 100 on the frequency band f1. Alternatively, the UE 100 may use configurations stored in advance (e.g., pre-configured radio resources for V2X).

In Step 402 of FIG. 4, in response to receiving the V2X support information, the UE 100 or the RSU 120 transmits, to the network 410, V2X terminal information (i.e., V2X UE Information) indicating that the UE 100 or the RSU 120 is interested in the V2X service.

The V2X UE Information may indicate at least one of: (a) the UE 100 or the RSU 120 is interested in the V2X service; (b) the UE 100 or the RSU 120 desires to use the V2X service; (c) a frequency band that the UE 100 or the RSU 120 supports for the V2X service; (d) a frequency band available to the UE 100 or the RSU 120 for the V2X service; (e) a type of V2X service in which the UE 100 or the RSU 120 is interested (e.g., V2V, V2I, V2P); and (f) a device type of the UE 100 or the RSU 120 (e.g., RSU, Vehicle, Pedestrian).

Additionally or alternatively, the V2X UE Information may include an RSU indication. The RSU indication indicates whether the source UE is an RSU. Further, the RSU indication may indicate a type of RSU. The RSU type may indicate a type of road on which an RSU is installed (e.g., an inbound lane, an outbound lane, a road under an elevated structure, an elevated road, a road on the ground, a road under the ground, a general road, or an expressway). The RSU indication may be transmitted from a Mobility Management Entity (MME) to an eNB (i.e., the eNB 130 or the RSU (eNB) 220) using an E-RAB SETUP REQUEST message or an INITIAL CONTEXT SETUP REQUEST message.

The V2X UE Information may be transmitted during a procedure for establishing a control connection (e.g., Radio Resource Control (RRC) Connection) with the eNB 130 or the RSU (eNB) 220. For example, the UE 100 or the RSU 120 may transmit the V2X UE Information using an RRC Connection Setup Complete message or a UE capability signalling during an RRC connection establishment procedure. When the RSU (UE) 120 transmits the V2X UE Information (e.g., RSU indication), the eNB 130 may transmit, using an S1AP INITIAL UE MESSAGE message or an E-RAB SETUP RESPONSE message, information indicating that this message relates to an RSU (e.g., RSU Indicator) to an MME.

In Step 403 of FIG. 4, the network 410 (e.g., the eNB 130, the RSU 220, or the V2X controller 150) transmits V2X configuration to the UE 100 or the RSU 120, in response to receiving the V2X UE Information from the UE 100 or the RSU 120. For example, the V2X configuration may be transmitted using an RRC Connection Reconfiguration message. The generation of the V2X configuration on the basis of the V2X UE Information transmitted from the UE 100 or the RSU 120 may be performed by the eNB 130 or the RSU 220 serving as an eNB, or it may be performed by the V2X controller 150. The UE 100 or the RSU 120 receives the V2X configuration transmitted from the network 410 and performs V2X communication in accordance with the received V2X configuration.

The V2X configuration may be transmitted on any one of the dedicated carrier frequency band f1 reserved for the V2X service, the shared frequency band f2 for LSA, and the carrier frequency band f3 licensed to the operator of the cellular communication network. Further, the V2X configuration may be transmitted from the RSU 120. For example, the RSU (UE) 120 may receive the V2X configuration transmitted from the eNB 130 and then groupcast (at least a part of) the V2X configuration on the frequency band f1 dedicated for the V2X service. Alternatively, the RSU (UE) 120 may transfer (or relay) the received V2X configuration to the UE 100 on the frequency band f1.

In some implementations, the V2X configuration may indicate measurement configuration of the carrier frequency band used for the V2X service. In some implementations, the V2X configuration may include radio resource configuration for the V2X service. This radio resource configuration may include configuration of a Data Radio Bearer (DRB), configuration of a Signalling Radio Bearer (SRB), or both. The DRB configuration may include at least one of the following elements:

Configuration of a Physical Multicast Channel (PMCH) for Multimedia Broadcast/Multicast Service (MBMS);

Configuration of a Physical Downlink Shared Channel (PDSCH) for Single Cell Point to Multi-point (SC-PTM);
Logical Channel ID (LCID); and
E-UTRAN Radio Access Bearer (E-RAB) identity.

Additionally or alternatively, the V2X configuration may indicate a radio resource pool to be used by the UE 100 or the RSU 120 for autonomous resource selection for the V2X service. The V2X configuration may indicate allocation of dedicated radio resources for the V2X service to the UE 100 or the RSU 120.

For example, in response to receiving from the RSU 120 the V2X UE Information containing the RSU indication indicating that the source UE is an RSU, the network 410 may transmit to the RSU 120 a V2X configuration indicating allocation of radio resources reserved for RSUs. Alternatively, in response to receiving a notification that is sent from a higher-level apparatus (e.g., MME) to a lower-level apparatus (e.g., eNB) of the network 410 to inform that a UE is an RSU, the network 410 may transmit to the RSU 120 the V2X configuration indicating allocation of radio resources reserved for RSUs. This allows the network 410 to distinguish the RSU 120 serving as a UE from the normal UE 100 and to allocate radio resources (e.g., frequencies), different from radio resources (e.g., frequencies) allocated to the normal UE 100, to the RSU 120 serving as a UE.

Additionally or alternatively, the network 410 may transmit, to the RSU 120, RSU configuration indicating how the RSU 120 should operate. The RSU configuration may be transmitted using an RRC Connection Reconfiguration message. The RSU configuration may include at least a part of the V2X configuration. The RSU configuration may implicitly or explicitly inform the RSU 120 about whether the RSU 120 should serve as a Relay UE to transmit the V2X report message to the network (e.g., eNB) or serve as a V2X UE to transmit the V2X report message to the network (e.g., eNB) in response to receiving a V2V message. When the RSU configuration implicitly indicates the above, the RSU 120 may make a determination based on whether the RSU configuration includes radio resource configuration information (e.g. Radio Resource configuration) that is necessary for the RSU 120 to serve as a Relay UE. For example, the RSU 120 may serve as a Relay UE when this radio resource configuration information is included, and the RSU 120 may serve as a V2V UE when this radio resource configuration information is not included. When the RSU configuration explicitly indicates the above, the RSU configuration may indicate an operation mode of an RSU. The operation mode may be, for example, a Relay UE mode or a V2V UE mode.

A V2X Service Area (SA) may be defined to specify an area where the same V2X configuration is applied. The V2X SA may be defined in any one of: a dedicated carrier frequency band f1 secured for the V2X Service; a shared frequency band f2 for LSA; and a carrier frequency band f3 licensed to an operator of a cellular communication network. For example, a cell may be defined on the frequency band f3, and meanwhile the V2X SA may be defined on the frequency band f1 or f2. The V2X SA may be defined independently from a cell(s) or may be defined in association with a cell(s). In the former case, there may be a plurality of V2X SAs in one cell or there may be a V2X SA across a plurality of cells (i.e., a V2X SA that at least partially covers each of the plurality of cells). In the latter case, one V2X SA may be defined by one cell or by a combination of cells. Further, when a UE moves between cells belonging to the same V2X SA (i.e., the UE performs a cell re-selection or handover between the cells), the UE may continue the V2X Service without suspending this service. Alternatively, the UE may suspend the V2X service while performing the cell re-selection or handover and then resume this service after completion of the cell re-selection or handover. That is, it can be considered that the V2X SA is a "valid area" of the V2X configuration. Information about the V2X SA (e.g., V2X SA Index (ID)) may be transmitted as one of information elements (IEs) contained in the V2X configuration or may be transmitted by a message or signalling other than the V2X configuration. For example, the eNB 130 or the RSU (eNB) 220 may incorporate the information about the V2X SA into the V2X configuration and then transmit the V2X configuration on the frequency band f3. In this case, the RSU (UE) 120 may further transmit information about the V2X SA on the frequency band f1 or f2. The RSU (UE) 120 may broadcast or groupcast the information about the V2X SA or transfer (or relay) this information to the UE 100.

According to the procedure described with reference to FIG. 4, it is possible to perform provisioning that is required for the UE 100 or the RSU 120, which serves as a UE, to start the V2X service.

Second Embodiment

This embodiment provides a specific example of a handover of a UE that supports the V2X service. In the example shown in FIG. 1, the UE 100 may perform a handover from a source cell served by an eNB 130S to a target cell served by an eNB 130T. In a similar way, in the example shown in FIG. 2, the UE 100 may perform a handover from a source cell served by the RSU (eNB) 220 to a target cell served by the RSU (eNB) 221.

Figure 5:
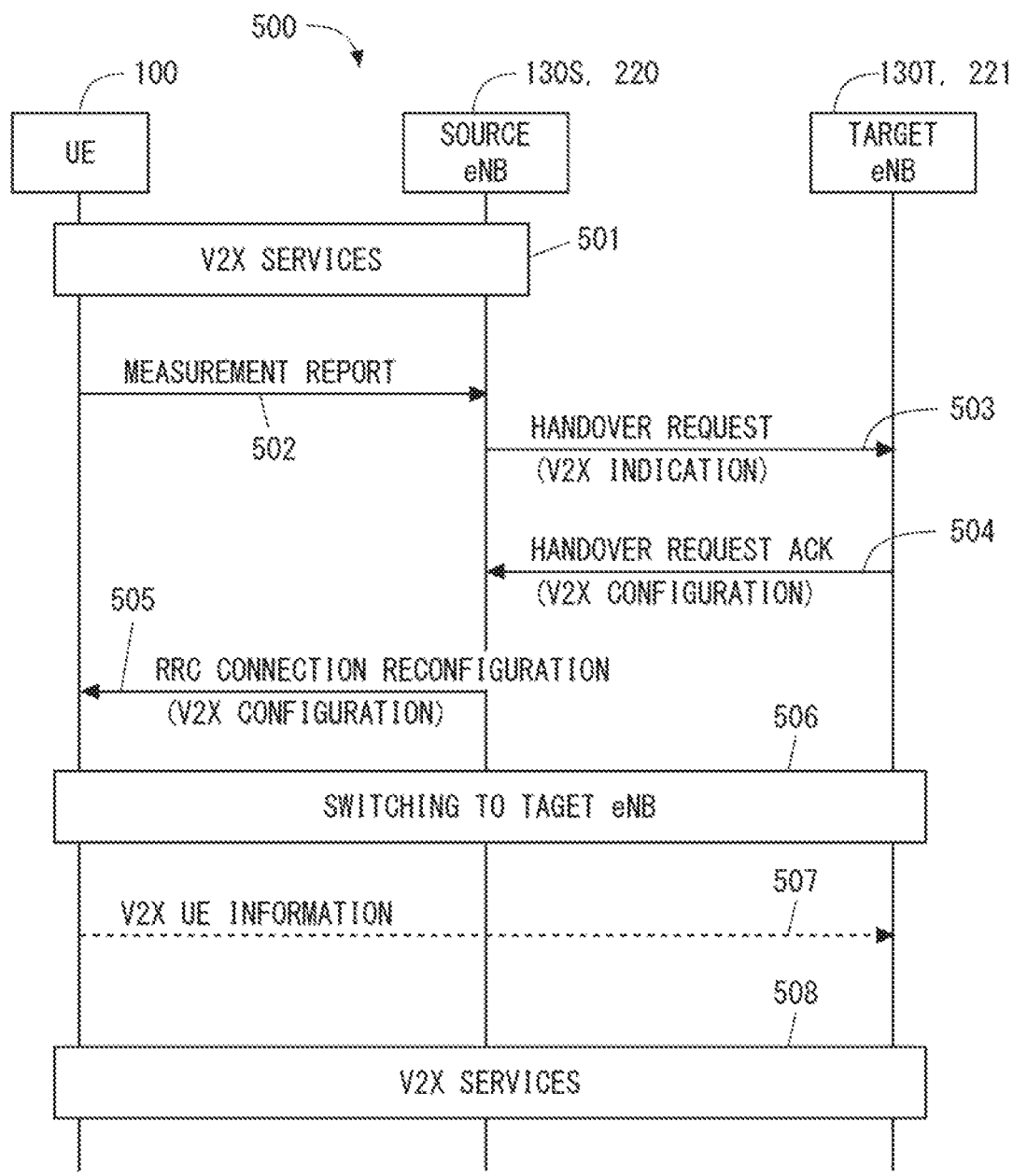
FIG. 5 is a sequence diagram showing one example of a handover procedure according to an embodiment.

FIG. 5 is a sequence diagram showing a process 500, which is one example of a handover procedure according to this embodiment. In Step 501, the UE 100 is connected to the source eNB 130S (or the RSU 220) and carries out the V2X service (i.e., V2X communication). In Step 502, the UE 100 transmits a measurement report to the source eNB 130S (or the RSU 220). This measurement report is transmitted when a value measured by the UE 100 meets a predetermined handover event condition.

In Step 503, the source eNB 130S (or the RSU 220) determines to perform a handover of the UE 100 based on the measurement report and sends a handover request that contains V2X indication to the target eNB 130T (or the RSU 221). The V2X indication indicates at least one of: the UE 100 is interested in the V2X service; the UE 100 is allowed to utilize the V2X service; the UE 100 has already been authenticated for the V2X service; and the UE 100 has already been approved for the V2X service.

In Step 504, in response to receiving the handover request, the target eNB 130T (or the RSU 221) sends to the source eNB 130S (or the RSU 220) a handover response (i.e., Handover Request ACK) indicating that it accepts the handover. This handover response contains V2X configuration regarding the target cell served by the target eNB 130T (or the RSU 221).

In Step 505, the source eNB 130S (or the RSU 220) transmits a handover command (i.e., RRC Connection Reconfiguration message) containing the V2X configuration regarding the target cell to instruct the UE 100 to perform the handover to the target cell. The V2X configuration may include information about the V2X service provided in the target cell or information about the V2X service area that the target cell contains (or the V2X service area in which the target cell is contained) (e.g., V2X SA Index (ID)).

In Step 506, in response to receiving the handover command (i.e., RRC Connection Reconfiguration message), the UE 100 switches to the target eNB 130T (or the RSU 221). That is, the UE 100 performs a random-access procedure to the target eNB 130T (or the RSU 221) to establish synchronization with the target cell and transmits a Handover Confirm message (i.e., RRC Connection Reconfiguration Complete message) to the target eNB 130T (or the RSU 221).

In Step 507, the UE 100 transmits the V2X UE Information to the target eNB 130T (or the RSU 221). Alternatively, the V2X UE Information about the UE 100 may be transmitted from the source eNB 130S (or the RSU 220) to the target eNB 130T (or the RSU 221) in Step 503. In this case, the transmission of the V2X UE Information in Step 507 may be omitted.

In Step 508, the UE 100 performs the V2X service (i.e., V2X communication) in the target cell served by the target eNB 130T (or the RSU 221).

As described above, in this embodiment, the source eNB 130S (or the RSU 220) is configured to send the V2X indication regarding the UE 100 to the target eNB 130T (or the RSU 221) during the handover preparation procedure (i.e., Step 503). Further, the target eNB 130T (or the RSU 221) is configured to, when it accepts the handover request containing the V2X indication, send the V2X configuration of the target cell to the source eNB 130S (or the RSU 220) during the handover preparation procedure (i.e., Step 504). The handover procedure in this embodiment, thus, allows the UE 100 to continue the V2X service after the handover. The UE 100 may continue the V2X service during the handover. For example, when the target cell (or the eNB 130T) of the handover provides the same V2X service as the source cell (or the eNB 130S), or when the target cell is included in the same V2X service area (V2X SA) as the source cell, the UE 100 may continue the V2X service.

Third Embodiment

Figure 6:
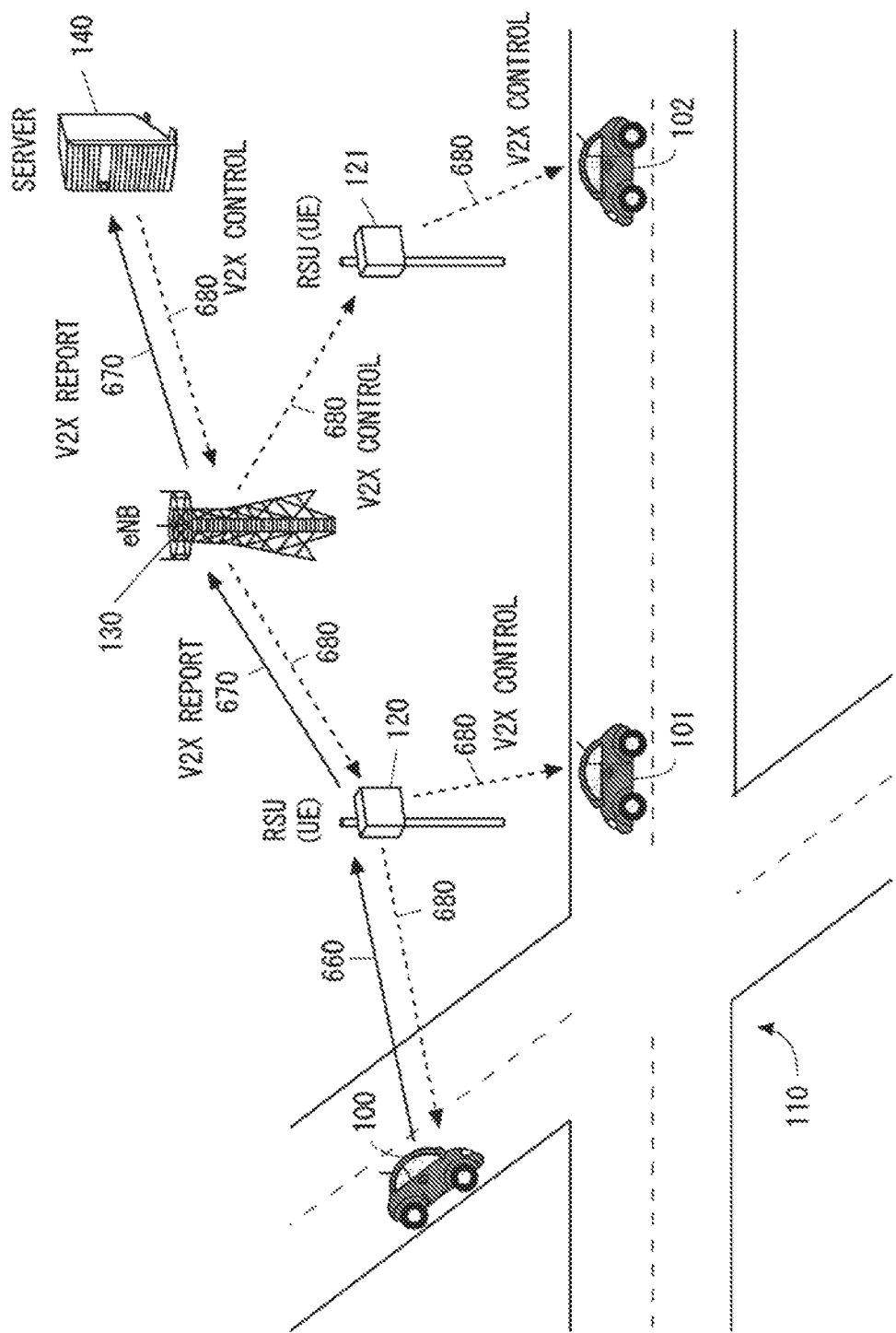
FIG. 6 is a diagram showing a first example of a message transfer in a radio communication system according to an embodiment.

This embodiment provides some specific examples of a message transfer regarding V2X. FIG. 6 shows a first example of the message transfer. In the example shown in FIG. 6, in response to receiving a notification 660 from the vehicle UE 100, the RSU (UE) 120 generates V2X report information 670 based on the notification 660 and sends the V2X report information 670 to the server 140 via the eNB 130.

For example, the RSU (UE) 120 may inspect (or detect) the content of the notification 660 in the application layer and generate the V2X report information 670 that contains the content of the notification 660. The RSU (UE) 120 may transmit the V2X report information 670 when the content of the notification 660 satisfies a predetermined condition (e.g., when the content of the notification 660 relates to a predetermined category, group, or service).

Alternatively, the RSU (UE) 120 may detect the type of content of the notification 660 (e.g., a category, a group, or a service) on the basis of a layer 2 header (e.g., a Medium Access Control (MAC) header) used for the transmission of the notification 660, and transmit the V2X report information 670 in response to detecting a predetermined content type.

The notification 660 may be, for example, but not limited to, a message regarding an emergency stop or an accident regarding a vehicle equipped with the UE 100, a message regarding a driving status of the vehicle, or a message regarding conditions of nearby roads (e.g., a traffic jam, weather, an accident, or an obstacle on the road). The UE 100 may incorporate into the notification 660 a V2V message received from another vehicle (UE) via V2V communication, or a message derived from the V2V message. The notification 660 may be a V2V message transmitted from the UE 100 to another (unspecified) UE and the RSU (UE) 120 may receive this V2V message as the notification 660. Alternatively, the notification 660 may be a dedicated message (e.g., Uu UL) from the UE 100 to the RSU (UE) 120 and the RSU (UE) 120 may receive this dedicated message as the notification 660.

The RSU (UE) 120 may autonomously generate the V2X report information 670 without depending on the reception of the notification 660 from the vehicle UE 100. For example, the RSU (UE) 120 may monitor conditions of roads in its management area (e.g., a traffic jam, weather, an accident, or an obstacle on the road) using sensors, such as cameras and weather instruments, and generate the V2X report information 670 based on the result of the monitoring.

In some implementations, the RSU (UE) 120 may transmit the V2X report information 670 to the sever 140 on the user plane (U-plane). In this case, the eNB 130 may simply transfer (transparently) the V2X report information 670. Alternatively, in some implementations, the RSU (UE) 120 may transmit the V2X report information 670 on the control plane (C-plane). In this case, the eNB 130 may generate a V2X report message containing the V2X report information 670 in response to receiving the V2X report information 670 from the RSU (UE) 120, and then transmit this V2X report message to the server 140. The eNB 130 may transmit this V2X report message either on the control plane (C-plane) or on the user plane (U-plane).

In response to receiving the V2X report information 670 from the RSU (UE) 120, the server 140 generates a V2X control message 680 based on the V2X report information 670. The V2X control message 680 may include, for example, a warning about road conditions (e.g., occurrence of an accident or a traffic jam) or detour route guidance. The server 140 transmits the V2X control message 680 in such a way that vehicle UEs including the vehicle UEs 100-102 can receive the V2X control message 680. In the example shown in FIG. 6, the V2X control message 680 is transmitted from the server 140 to the RSUs (UEs) 120 and 121 via the eNB 130 and then transmitted to the vehicle UEs 100-102 by each RSU (UE). Each RSU may transmit the V2X control message 680 to each UE via unicast, or it may transmit the V2X control message 680 to a plurality of UEs via groupcast, multicast, or broadcast. In the groupcast, for example, a receiver side (e.g., UE) determines whether information should be received by performing certain filtering processing, and restores this information if this information should be received. In the certain filtering processing, for example, a UE may restore a group identifier contained in the layer-2 header and determine whether this group identifier should be received. The group identifier may be configured in the receiver side (e.g., UE) in advance or may be sent from the transmitter side (e.g., eNB or application server). The group identifier may be information indicating a specific group (e.g., UEs) or may be a V2X SA Index (ID).

Figure 7:
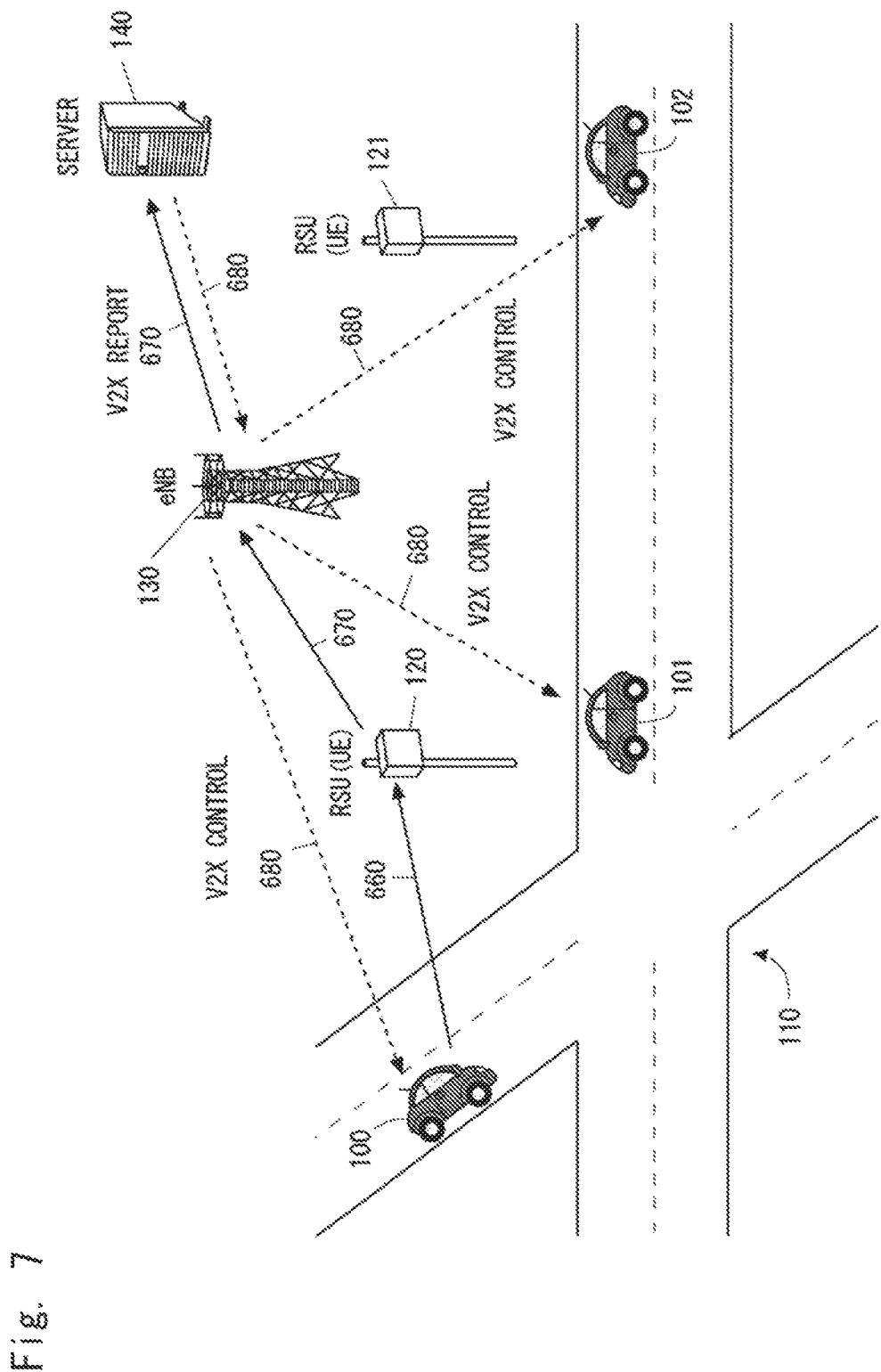
FIG. 7 is a diagram showing a second example of a message transfer in a radio communication system according to an embodiment.

A second example shown in FIG. 7 shows another delivery path of the V2X control message 680 different from the delivery path shown in FIG. 6. In the example shown in FIG. 7, the V2X control message 680 is transmitted from the eNB 130 directly to the vehicle UEs 100-102 without traversing the RSUs (UEs) 120 and 121. For example, the eNB 130 may broadcast/multicast the V2X control message 680 in such a way that a plurality of UEs located within a cell served by the eNB 130 can receive this message.

In some implementations, the eNB 130 may transmit the V2X control message 680 on the user plane (U-plane). Specifically, the eNB 130 may transmit the V2X control message 680 using a broadcast bearer, a multicast bearer, or a Point-to-Multipoint (PTM) bearer. The V2X control message 680 may be transmitted on a Data Radio Bearer for carrying MBMS data, i.e., an MBMS Radio Bearer (MRB) or a Point-to-Multipoint (PTM) Radio Bearer. In MBMS, the same data (message) is transmitted to a plurality of UEs via a common MRB (or a PTM radio bearer).

Alternatively, in some implementations, the eNB 130 may transmit the V2X control message 680 on the control plane (C-plane). The eNB 130 may transmit the V2X control message 680 on a Broadcast Control Channel (BCCH) that carries a System Information Block (SIB). For example, a Public Warning System (PWS) for CBS in LTE/Evolved Packet System (EPS) may be used. The 3GPP specifies, as the PWS, Earthquake and Tsunami Warning System (ETWS) used in Japan, Commercial Mobile Alert System (CMAS) used in North America, Korean Public Alert System (KPAS) used in Korea, and EU-ALERT used in European countries. In the PWS, warning messages (Primary Notification and Secondary Notification) are transmitted by SIB 10 and SIB 11. When the V2X control message 680 is transmitted on the C-plane, it may be transmitted from the server 140 to the eNB 130 via an MME. In this case, the V2X control message may be transmitted by a WRITE-REPLACE WARNING REQUEST message.

Figure 8:
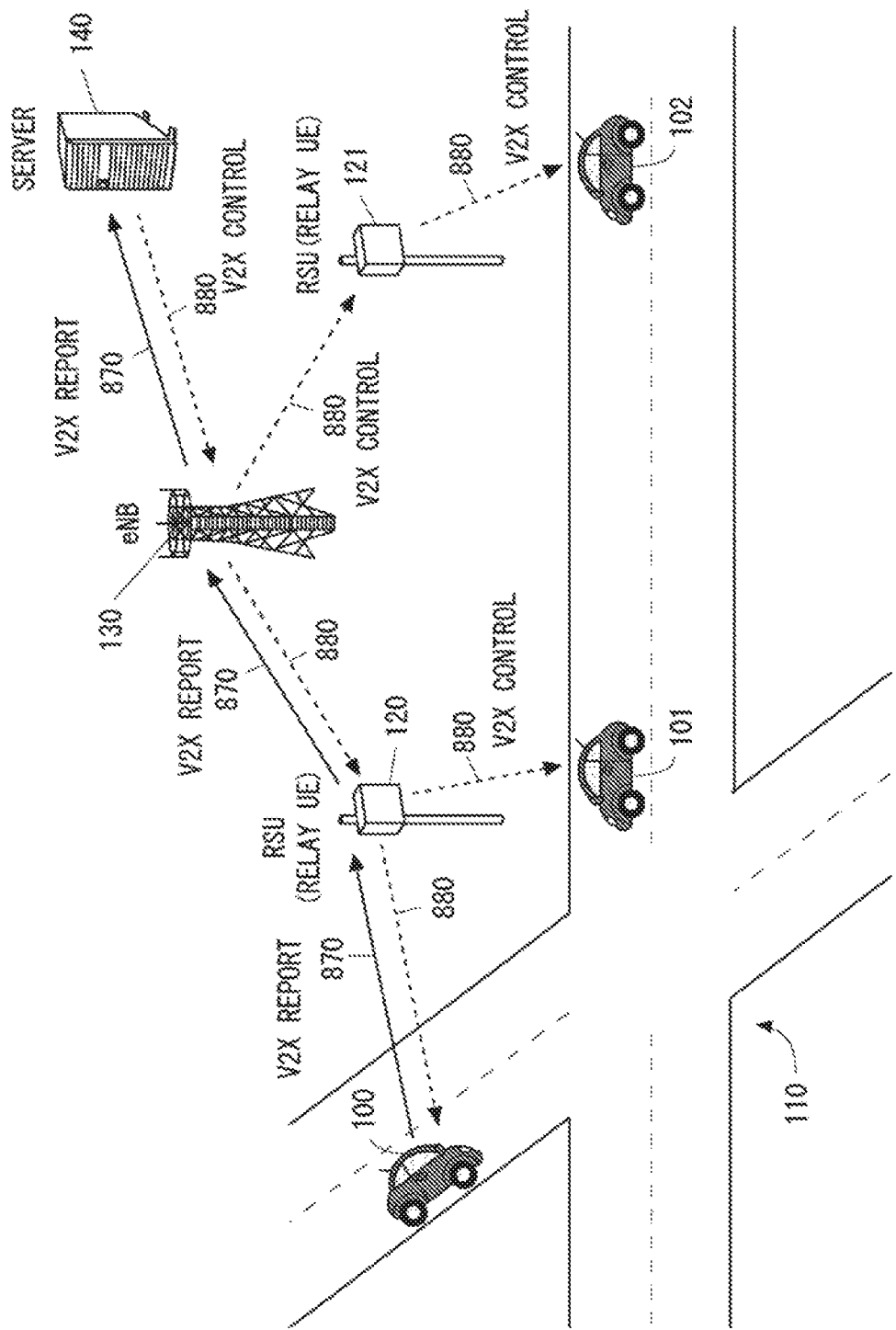
FIG. 8 is a diagram showing a third example of a message transfer in a radio communication system according to an embodiment.

FIG. 8 shows a third example of the message transfer. In the example shown in FIG. 8, the RSUs 120 and 121 each serve as a ProSe UE-to-Network Relay (i.e., a Relay UE). The RSUs 120 and 121 serving as ProSe UE-to-Network Relays (i.e., Relay UEs) do transmit the application layer of the vehicle UE 100 (i.e., ProSe Remote UE) transparently without terminating it. Accordingly, in the example shown in FIG. 8, the RSU 100 receives, from the UE 100, V2X report information 870 that is application-layer information, and then forwards this information to the eNB 130. That is, the V2X report information 870 transmitted from the vehicle UE 100 is relayed by the RSU 120 serving as a Relay UE and by the eNB 130, and finally reaches the server 140. The server 140 generates a V2X control message 880 in response to receiving the V2X report information 870, and transmits this message to the plurality of UEs 100-102. The V2X control message 880 may be transmitted to the plurality of UEs 100-102 via the eNB 130 and the RSU 120 or 121. Alternatively, similar to the second example described with reference to FIG. 7, the V2X control message 880 may be transmitted from the eNB 130 directly to the plurality of UEs 100-102 without traversing the RSUs 10 and 121.

Figure 9:
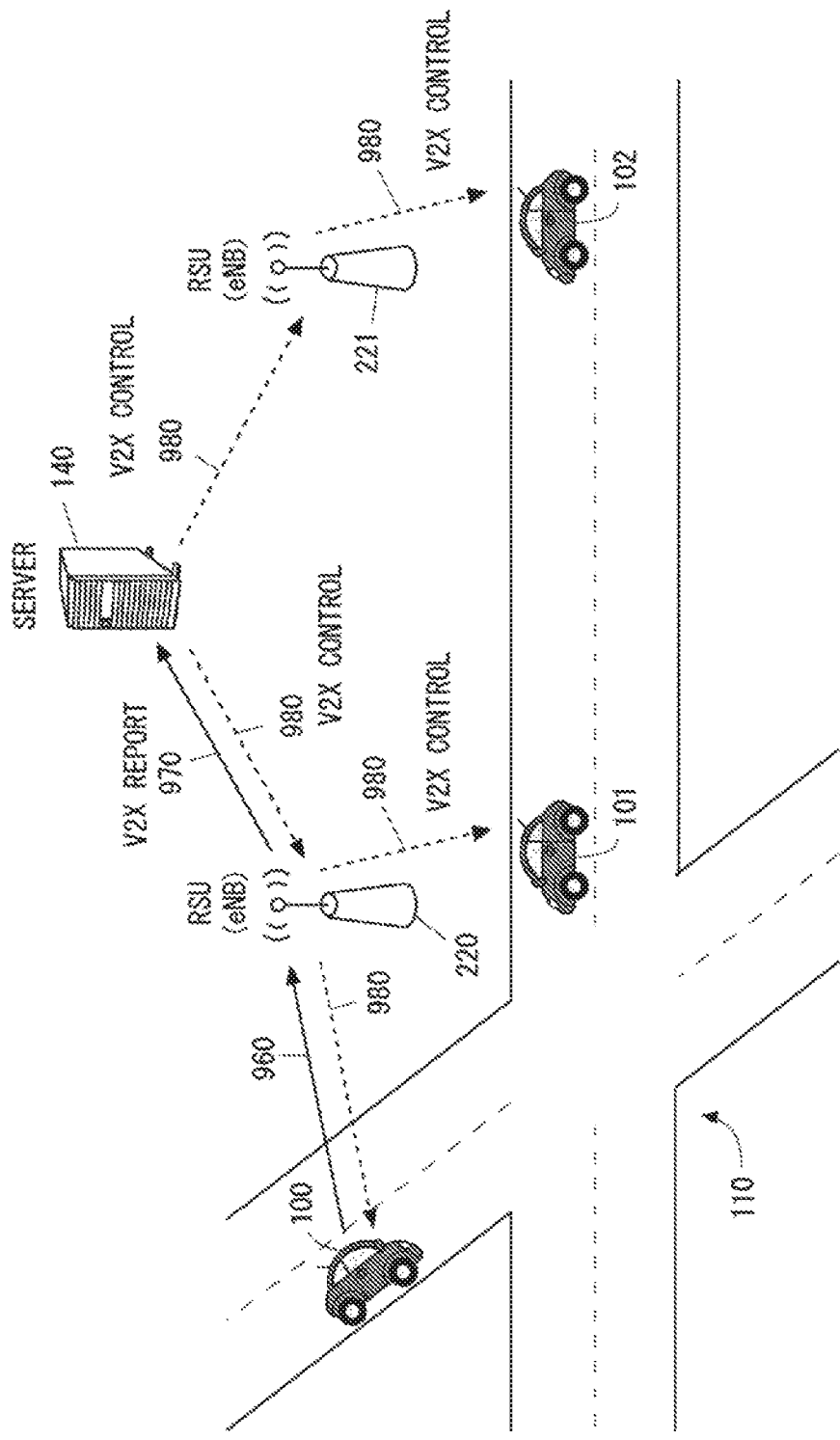
FIG. 9 is a diagram showing a fourth example of a message transfer in a radio communication system according to an embodiment.

FIG. 9 shows a fourth example of the message transfer. In the example shown in FIG. 9, each of the RSUs 220 and 221 serves as a base station (eNB). In response to receiving a notification 960 from the vehicle UE 100, the RSU (eNB) 220 generates a V2X report information 970 based on the notification 960 and sends the V2X report information 970 to the server 140. The notification 960 may be a dedicated message (e.g., Uu UL) from the UE 100 to an RSU (eNB), or it may be a V2V message. The RSU (eNB) 220 may transmit the V2X report information 970 either on the control plane (C-plane) or on the user plane (U-plane).

In response to receiving the V2X report information 970 from the RSU (eNB) 220, the server 140 generates a V2X control message 980 based on the V2X report information 970. Similar to the examples shown in FIGS. 6 and 7, the server 140 transmits the V2X control message 980 in such a way that a plurality of vehicle UEs including the vehicle UEs 100-102 can receive the V2X control message 980. However, in the example shown in FIG. 9, the V2X control message 980 is transmitted from the server 140 to the RSUs (eNBs) 220 and 221 and is transmitted to the vehicle UEs 100-102 by the RSUs (eNBs). The RSUs (eNBs) 220 and 221 may transmit the V2X control message 980 either on the U-plane or on the C-plane, similar to the eNB 130 shown in FIG. 7.

FIGS. 6-9 show the examples in which the V2X control messages 680, 880, and 980 are received by the plurality of vehicle UEs 100-102. However, the V2X control messages 680, 880, and 980 may be received by pedestrians (i.e., pedestrian UEs). The V2X control message may contain information for vehicle UEs and information for pedestrian UEs, and each UE performs filtering to extract the necessary information from the V2X control message. The V2X control message for vehicle UEs and the V2X control message for pedestrian UEs may be transmitted using transmission formats different from each other (e.g., U-plane and C-plane).

The plurality of examples of the message transfer shown in FIGS. 6-9 may be appropriately combined with one another. Specifically, any one of the three paths 361, 362, and 363 shown in FIG. 3 may be used for the message transfer from the vehicle UE 100 to the server 140. In a similar way, any one of the three paths 361, 362, and 363 shown in FIG. 3 may be used for the message transfer from the server 140 to the vehicle UE 100.

When the RSU (UE) 120 and the eNB 130 shown in FIG. 6 are used together with the RSU (eNB) 220 shown in FIG. 9, the eNB 130 may transfer the V2X report information 670 to the RSU (eNB) 220 via an inter-base-station interface (e.g., X2 interface). Further, the eNB 130 may transfer the V2X control message 680 to the RSU (eNB) 220 via an inter-base-station interface (e.g., X2 interface).

Figure 10:
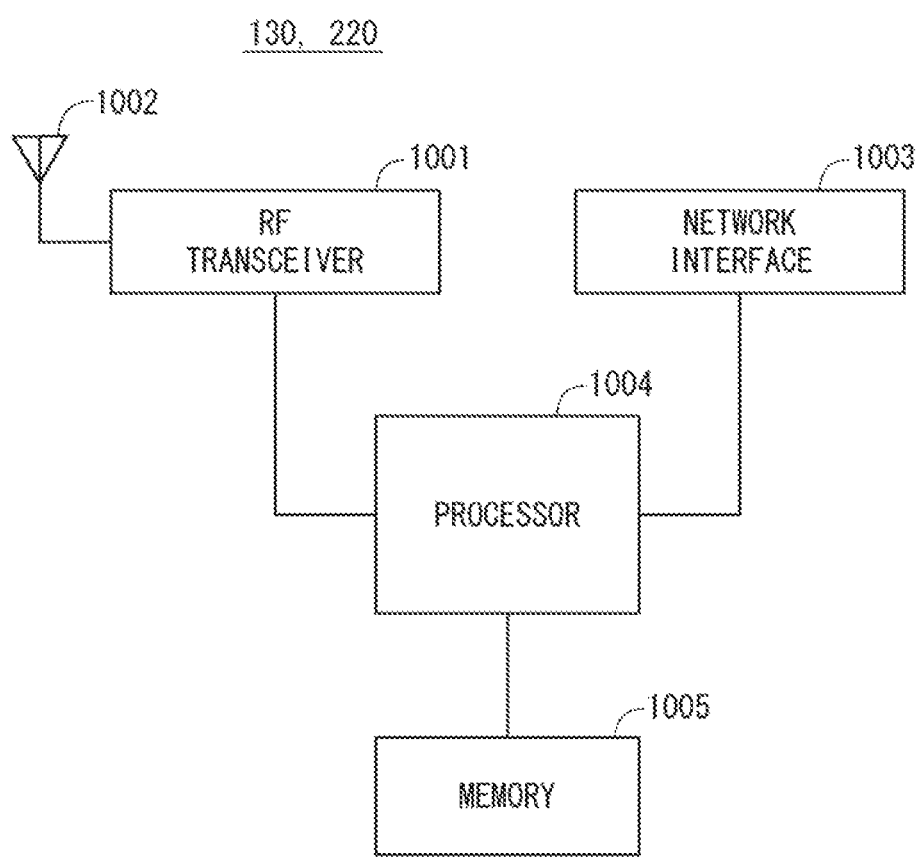
FIG. 10 is a block diagram showing a configuration example of an RSU and a base station according to an embodiment.

The following provides configuration examples of the UEs 100-102, the RSUs 120 and 220, the eNB 130, the server 140, and the V2X controller 150 described in the above embodiments. FIG. 10 is a block diagram showing a configuration example of the eNB 130. The RSU 220, which serves as an eNB, may have a configuration similar to that shown in FIG. 10. Referring to FIG. 10, the eNB 130 includes an RF transceiver 1001, a network interface 1003, a processor 1004, and a memory 1005. The RF transceiver 1001 performs analog RF signal processing to communicate with UEs. The RF transceiver 1001 may include a plurality of transceivers. The RF transceiver 1001 is coupled to an antenna 1002 and the processor 1004. The RF transceiver 1001 receives modulated symbol data (or OFDM symbol data) from the processor 1004, generates a transmission RF signal, and supplies the transmission RF signal to the antenna 1002. Further, the RF transceiver 1001 generates a baseband reception signal based on a reception RF signal received by the antenna 1002 and supplies the baseband reception signal to the processor 1004.

The network interface 1003 is used to communicate with the network node (e.g., other eNBs, Mobility Management Entity (MME), Serving Gateway (S-GW), and TSS or ITS server). The network interface 1003 may include, for example, a network interface card (NIC) conforming to the IEEE 802.3 series.

The processor 1004 performs data plane processing including digital baseband signal processing and control plane processing for radio communication. In the case of LTE and LTE-Advanced, for example, the digital baseband signal processing performed by the processor 1004 may include signal processing of a PDCP layer, an RLC layer, a MAC layer, and a PHY layer. Further, the signal processing performed by the processor 1004 may include signal processing of a GTP-U·UDP/IP layer for X2-U and S1-U interfaces. Further, the control plane processing performed by the processor 1004 may include processing of an X2AP protocol, an S1-MME protocol, and an RRC protocol.

The processor 1004 may include a plurality of processors. The processor 1004 may include, for example, a modem processor (e.g., a DSP) that performs the digital baseband signal processing, a processor (e.g., a DSP) that performs signal processing of the GTP-U·UDP/IP layer for the X2-U and S1-U interfaces, and a protocol stack processor (e.g., a CPU or an MPU) that performs the control plane processing.

The memory 1005 is composed of a combination of a volatile memory and a non-volatile memory. The memory 1005 may include a plurality of memory devices that are physically independent from each other. The volatile memory is, for example, a Static Random Access Memory (SRAM), a Dynamic RAM (DRAM), or a combination thereof. The non-volatile memory is a mask Read Only Memory (MROM), an Electrically Erasable Programmable ROM (EEPROM), a flash memory, a hard disc drive, or any combination thereof. The memory 1005 may include a storage that is located away from the processor 1004. In this case, the processor 1004 may access the memory 1005 via the network interface 1003 or an I/O interface (not shown).

The memory 1005 may store software modules (computer programs) including instructions and data to perform the processing by the eNB 130 described in the above embodiments. In some implementations, the processor 1004 may be configured to load the software modules from the memory 1005 and execute the loaded software modules, thereby performing processing of the eNB 130 described in the above embodiments.

Figure 11:
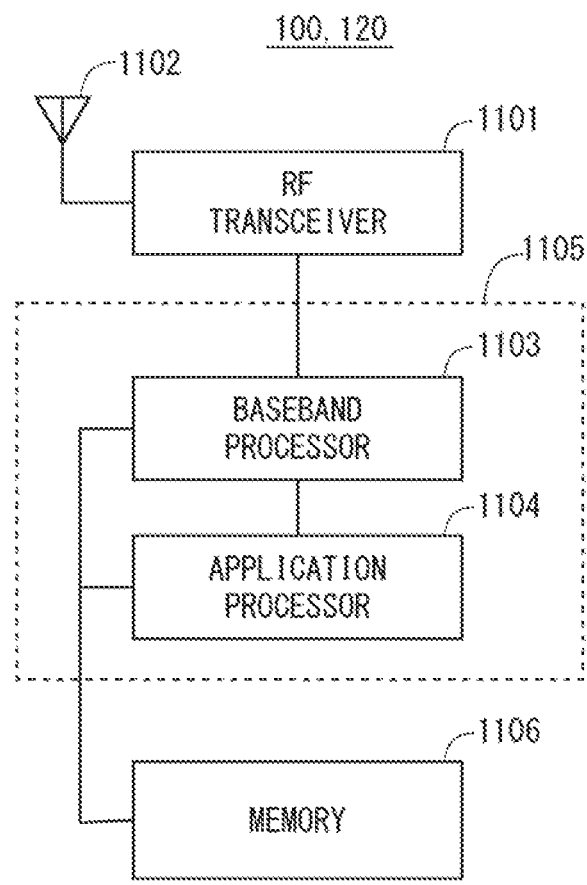
FIG. 11 is a block diagram showing a configuration example of an RSU and a radio terminal according to an embodiment.

FIG. 11 is a block diagram showing a configuration example of the RSU 120 serving as a UE (or a Relay UE). The UEs 101 and 102 may have configurations similar to the configuration shown in FIG. 11. A Radio Frequency (RF) transceiver 1101 performs analog RF signal processing to communicate with the eNB 130. The analog RF signal processing performed by the RF transceiver 1101 includes frequency up-conversion, frequency down-conversion, and amplification. The RF transceiver 1101 is coupled to an antenna 1102 and a baseband processor 1103. That is, the RF transceiver 1101 receives modulated symbol data (or OFDM symbol data) from the baseband processor 1103, generates a transmission RF signal, and supplies the transmission RF signal to the antenna 1102. Further, the RF transceiver 1101 generates a baseband reception signal based on a reception RF signal received by the antenna 1102, and supplies the baseband reception signal to the baseband processor 1103.

The baseband processor 1103 performs digital baseband signal processing (i.e., data plane processing) and control plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). On the other hand, the control plane processing includes communication management of layer 1 (e.g., transmission power control), layer 2 (e.g., radio resource management and hybrid automatic repeat request (HARQ) processing), and layer 3 (e.g., signalling regarding attach, mobility, and call management).

In the case of LTE and LTE-Advanced, for example, the digital baseband signal processing performed by the baseband processor 1103 may include signal processing of a Packet Data Convergence Protocol (PDCP) layer, a Radio Link Control (RLC) layer, the MAC layer, and the PHY layer. Further, the control plane processing performed by the baseband processor 1103 may include processing of a Non-Access Stratum (NAS) protocol, an RRC protocol, and MAC CEs.

The baseband processor 1103 may include a modem processor (e.g., a Digital Signal Processor (DSP)) that performs the digital baseband signal processing and a protocol stack processor (e.g., a Central Processing Unit (CPU) or a Micro Processing Unit (MPU)) that performs the control plane processing. In this case, the protocol stack processor, which performs the control plane processing, may be integrated with an application processor 1104 described in the following.

The application processor 1104 is also referred to as a CPU, an MPU, a microprocessor, or a processor core. The application processor 1104 may include a plurality of processors (processor cores). The application processor 1104 executes a system software program (Operating System (OS)) and various application programs (e.g., a voice call application, a WEB browser, a mailer, a camera operation application, and a music player application) loaded from a memory 1106 or from another memory (not shown), thereby providing various functions of the RSU 120.

In some implementations, as represented by a dashed line (1105) in FIG. 11, the baseband processor 1103 and the application processor 1104 may be integrated on a single chip. In other words, the baseband processor 1103 and the application processor 1104 may be implemented in a single System on Chip (SoC) device 1105. An SoC device may be referred to as a system Large Scale Integration (LSI) or a chipset.

The memory 1106 is a volatile memory, a non-volatile memory, or a combination thereof. The memory 1106 may include a plurality of memory devices that are physically independent from each other. The volatile memory is, for example, a Static Random Access Memory (SRAM), a Dynamic RAM (DRAM), or a combination thereof. The non-volatile memory is, for example, a Mask Read Only memory (MROM), an Electrically Erasable Programmable ROM (EEPROM), a flash memory, a hard disc drive, or any combination thereof. The memory 1106 may include, for example, an external memory device that can be accessed from the baseband processor 1103, the application processor 1104, and the SoC 1105. The memory 1106 may include an internal memory device that is integrated in the baseband processor 1103, the application processor 1104, or the SoC 1105. Further, the memory 1106 may include a memory in a Universal Integrated Circuit Card (UICC).

The memory 1106 may store software modules (computer programs) including instructions and data to perform processing by the RSU 120 described in the above embodiments. In some implementations, the baseband processor 1103 or the application processor 1104 may load the software modules from the memory 1106 and execute the loaded software modules, thereby performing the processing of the RSU 120 described in the above embodiments.

Figure 12:
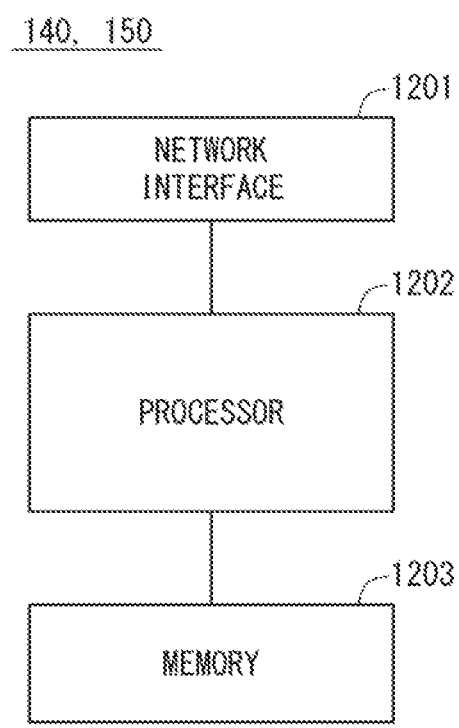
FIG. 12 is a block diagram showing a configuration example of a server and a V2X controller according to an embodiment.

FIG. 12 is a block diagram showing a configuration example of the server 140. The V2X controller 150 may also have a configuration similar to the configuration shown in FIG. 12. Referring to FIG. 12, the server 140 includes a network interface 1201, a processor 1202, and a memory 1203. The network interface 1201 is used to communicate with the network node (e.g., the eNodeB 130, the MME, or the P-GW). The network interface 1201 may include, for example, a network interface card (NIC) conforming to the IEEE 802.3 series.

The processor 1202 loads software (computer programs) from the memory 1203 and executes the loaded software (computer programs), thereby performing processing of the server 140 described with reference to the sequence diagram and the flowchart in the above-described embodiments. The processor 1202 may be, for example, a microprocessor, an MPU, or a CPU. The processor 1202 may include a plurality of processors.

The memory 1203 is composed of a combination of a volatile memory and a non-volatile memory. The memory 1203 may include a storage that is located away from the processor 1202. In this case, the processor 1202 may access the memory 1203 via an I/O interface (not shown).

In the example shown in FIG. 12, the memory 1203 is used to store software modules. The processor 1202 loads these software modules from the memory 1203 and executes the loaded software modules, thereby performing processing of the server 140 described in the above embodiments.

As described above with reference to FIGS. 10-12, each of the processors included in the UEs 100-102, the RSUs 120 and 320, the eNB 130, the server 140, and the V2X controller 150 according to the above embodiments executes one or more programs including instructions to cause a computer to perform an algorithm described with reference to the drawings. The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Other Embodiments

In the configuration shown in FIG. 1, the RSUs 120 and 121 each may be configured to periodically transmit a keep-alive message or a heartbeat message to the eNB 130 or the server 140. Upon failing to receive a keep-alive or heartbeat message from an RSU, the eNB 130 or the server 140 may detect that a fault has occurred in this RSU.

The descriptions of the above embodiments mainly focus on LTE/LTE-Advanced and extensions thereof. However, the above-described embodiments may be applied to other radio communication networks or systems.

Further, the embodiments described above are merely examples of applications of the technical ideas obtained by the present inventors. Needless to say, these technical ideas are not limited to the above-described embodiments and various modifications can be made thereto.

This application is based upon and claims the benefit of priority from Japanese Patent Application No. 2015-185290, filed on Sep. 18, 2015, the disclosure of which is incorporated herein in its entirety by reference.

REFERENCE SIGNS LIST 100-102 UE
120, 121 RSU
130 eNB
140 SERVER
150 V2X CONTROLLER
220, 221 RSU
1001 RF TRANSCEIVER
1004 PROCESSOR
1101 RF TRANSCEIVER
1103 BASEBAND PROCESSOR
1104 APPLICATION PROCESSOR
1202 PROCESSOR
1203 MEMORY

The invention claimed is:

1. A base station apparatus used in a cellular communication network, the base station apparatus comprising:
at least one wireless transceiver; and
at least one processor configured to:
transmit V2X support information via the at least one wireless transceiver, the V2X support information indicating that a Vehicle-to-Everything (V2X) Service is supported by a serving network including the base station apparatus; and
in response to receiving V2X terminal information transmitted from a first radio terminal that has received the V2X support information, transmit V2X configuration to the first radio terminal,
wherein the V2X terminal information indicates a frequency which is used by the first radio terminal for the V2X service.

2. The base station apparatus according to claim 1, wherein the at least one processor is configured to broadcast the V2X support information in such a way that a plurality of radio terminals including the first radio terminal are able to receive the V2X support information in a cell provided by the base station apparatus.

3. The base station apparatus according to claim 1, wherein the at least one processor is configured to transmit the V2X support information on both a first carrier frequency band used for cellular communication and a second carrier frequency band used for the V2X service.

4. The base station apparatus according to claim 1, wherein the V2X support information indicates at least one of: (a) the V2X service is available; (b) a carrier frequency band to be used for the V2X service; (c) measurement configuration of the carrier frequency band used for the V2X service; (d) a supported type of the V2X service; and (e) transmission power allowed for the radio terminal for the V2X service.

5. The base station apparatus according to claim 1, wherein the V2X terminal information indicates at least one of a frequency band that the first radio terminal supports for the V2X service or a frequency band available to the first radio terminal for the V2X service.

6. The base station apparatus according to claim 1, wherein the V2X terminal information indicates whether the first radio terminal is a Road Side Unit (RSU).

7. The base station apparatus according to claim 6, wherein the at least one processor is configured to, when the first radio terminal is an RSU, transmit to the first radio terminal the V2X configuration indicating allocation of a radio resource reserved for RSUs.

8. The base station apparatus according to claim 1, wherein the V2X configuration indicates the second radio resource pool to be used by the first radio terminal for autonomous resource selection for the V2X service.

9. The base station apparatus according to claim 1, wherein the V2X configuration indicates allocation of a dedicated radio resource for the V2X service to the first radio terminal.

10. The base station apparatus according to claim 1, wherein the base station apparatus serves as a Road Side Unit (RSU) that supports the V2X service.

11. The base station apparatus according to claim 1, wherein
the at least one processor is configured to transmit, to a target base station, a handover request regarding the first radio terminal, and
the handover request indicates at least one of: the first radio terminal is interested in the V2X service; the first radio terminal has already been allowed to utilize the V2X service; the first radio terminal has already been authenticated for the V2X service; and the first radio terminal has already been approved for the V2X service.

12. The base station apparatus according to claim 11, wherein the at least one processor is configured to, in response to the transmission of the handover request, receive from the target base station a handover response indicating V2X configuration of a target cell.

13. The base station apparatus according to claim 1, wherein the V2X support information indicates a first radio resource pool and a second radio resource pool, wherein the first radio resource pool and the second radio resource pool are configured for autonomous resource selection for the V2X service by a plurality of radio terminals including the first radio terminal,
wherein the V2X support information indicates the first radio resource pool is associated with a first V2X service area, and
wherein the V2X support information indicates the second radio resource pool is associated with a second V2X service area, and
wherein at least one of the first V2X service area and the second V2X service area at least partially covers each of two or more cells of the cellular communication network.

14. The base station apparatus of claim 13, wherein at least one of the first V2X service area and the second V2X service area corresponds to two or more cells of the cellular communication network.

15. A method in a base station apparatus used in a cellular communication network, the method comprising:
transmitting V2X support information indicating that a Vehicle-to-Everything (V2X) Service is supported by a serving network including the base station apparatus; and
in response to receiving V2X terminal information transmitted from a first radio terminal that has received the V2X support information, transmitting V2X configuration to the first radio terminal,
wherein the V2X terminal information indicates a frequency which is used by the first radio terminal for the V2X service.

16. The method according to claim 15, wherein the V2X terminal information indicates at least one of a frequency band that the first radio terminal supports for the V2X service or a frequency band available to the first radio terminal for the V2X service.

17. The method according to claim 15, wherein the V2X support information indicates a first radio resource pool and a second radio resource pool, wherein the first radio resource pool and the second radio resource pool are configured for autonomous resource selection for the V2X service by a plurality of radio terminals including the first radio terminal,
wherein the V2X support information indicates the first radio resource pool is associated with a first V2X service area, and
wherein the V2X support information indicates the second radio resource pool is associated with a second V2X service area, and
wherein at least one of the first V2X service area and the second V2X service area at least partially covers each of two or more cells of the cellular communication network.

18. A radio terminal comprising:
at least one wireless transceiver; and
at least one processor configured to:
receive V2X support information from a serving network via the at least one wireless transceiver, the V2X support information indicating that a Vehicle-to-Everything (V2X) Service is supported by the serving network;
transmit V2X terminal information to the serving network in response to receiving the V2X support information, the V2X terminal information indicating that the radio terminal is interested in the V2X service;
receive V2X configuration that is transmitted from the serving network in response to the transmission of the V2X terminal information; and
perform V2X communication in accordance with the V2X configuration,
wherein the V2X terminal information indicates a frequency which is used by the first radio terminal for the V2X service.

19. The radio terminal according to claim 18, wherein the at least one processor is configured to receive the V2X support information on both a first carrier frequency band used for cellular communication and a second carrier frequency band used for the V2X service.

20. The radio terminal according to claim 18, wherein the V2X terminal information indicates at least one of a frequency band that the radio terminal supports for the V2X service or a frequency band available to the radio terminal for the V2X service.

21. The radio terminal according to claim 18, wherein the V2X terminal information indicates wither the radio terminal is a Road Side Unit (RSU).

22. The radio terminal according to claim 21, wherein the at least one processor is configured to, in response to the transmission of the V2X terminal information indicating that the radio terminal is an RSU, receive the V2X configuration indicating allocation of a radio resource reserved for RSUs.

23. The radio terminal according to claim 18, wherein the V2X support information indicates a first radio resource pool and a second radio resource pool, wherein the first radio resource pool and the second radio resource pool are configured for autonomous resource selection for the V2X service by a plurality of radio terminals including the first radio terminal, wherein the V2X support information indicates the first radio resource pool is associated with a first V2X service area, and wherein the V2X support information indicates the second radio resource pool is associated with a second V2X service area, and wherein at least one of the first V2X service area and the second V2X service area at least partially covers each of two or more cells of the cellular communication network.

24. The base station apparatus according to claim 13, wherein the first radio resource pool further comprises: a radio resource pool per type of V2X service included in the V2X service; a radio resource pool per V2X operation mode of a radio terminal; a radio resource pool per device type of a radio terminal; or a radio resource pool per pre-configured category.

* * * * *